(12) United States Patent
Chen et al.

(10) Patent No.: US 8,982,073 B2
(45) Date of Patent: Mar. 17, 2015

(54) METHOD AND TERMINAL FOR DISPLAYING PICTURE/INTERFACE

(75) Inventors: Zhigang Chen, Shenzhen (CN); Pei Wang, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 212 days.

(21) Appl. No.: 13/541,450

(22) Filed: Jul. 3, 2012

(65) Prior Publication Data

US 2012/0268408 A1    Oct. 25, 2012

Related U.S. Application Data

(63) Continuation of application No. PCT/CN2010/080561, filed on Dec. 31, 2010.

(30) Foreign Application Priority Data

Jan. 6, 2010 (CN) .......................... 2010 1 0042617
Apr. 30, 2010 (CN) .......................... 2010 1 0169417

(51) Int. Cl.
*G06F 3/041* (2006.01)
*H04M 1/725* (2006.01)
*G06F 3/0488* (2013.01)

(52) U.S. Cl.
CPC ......... *H04M 1/72544* (2013.01); *G06F 3/0488* (2013.01); *G06F 2203/04806* (2013.01); *G06F 3/0414* (2013.01)
USPC .......................................... 345/173; 345/178

(58) Field of Classification Search
CPC ................ G06F 3/0414; G06F 3/0488; G06F 2203/04806
USPC ............. 345/156–184; 379/100.01; 704/201; 370/310; 715/776
See application file for complete search history.

(56) References Cited

U.S. PATENT DOCUMENTS

| | | | |
|---|---|---|---|
| 8,209,623 B2 * | 6/2012 | Barletta et al. ................. | 715/776 |
| 2004/0227739 A1 * | 11/2004 | Tani et al. ...................... | 345/173 |
| 2005/0081244 A1 | 4/2005 | Barrett et al. | |
| 2005/0245302 A1 * | 11/2005 | Bathiche et al. .................. | 463/1 |
| 2005/0264521 A1 * | 12/2005 | Liu et al. ........................ | 345/156 |

(Continued)

FOREIGN PATENT DOCUMENTS

| CN | 1598869 A | 3/2005 |
|---|---|---|
| CN | 1808362 A | 7/2006 |

(Continued)

OTHER PUBLICATIONS

International Search Report issued in corresponding PCT Patent Application No. PCT/CN2010/080561, mailed Mar. 31, 2011.

(Continued)

*Primary Examiner* — Prabodh M Dharia
(74) *Attorney, Agent, or Firm* — Brinks Gilson & Lione

(57) ABSTRACT

A method for displaying a picture/interface on a screen of a terminal comprises obtaining relevant information on a pressure, when the pressure is detected to be applied on the screen, obtaining a corresponding display mode according to the relevant information on the pressure, and displaying the picture/interface according to the display mode. The terminal may adjust the display mode automatically according to the pressure applied on the screen of the terminal by the user, with strong real-time property, simplifying the operations by the user on the terminal and improving the user's experience.

15 Claims, 5 Drawing Sheets

(56) References Cited

U.S. PATENT DOCUMENTS

| | | | |
|---|---|---|---|
| 2006/0187142 A1* | 8/2006 | Lesniak | 345/1.1 |
| 2006/0230108 A1 | 10/2006 | Tatsuta et al. | |
| 2006/0238517 A1* | 10/2006 | King et al. | 345/173 |
| 2006/0284858 A1 | 12/2006 | Rekimoto | |
| 2007/0168413 A1* | 7/2007 | Barletta et al. | 709/203 |
| 2007/0192692 A1 | 8/2007 | Chen et al. | |
| 2007/0220418 A1* | 9/2007 | Matsui et al. | 715/511 |
| 2008/0024454 A1 | 1/2008 | Everest | |
| 2008/0181151 A1* | 7/2008 | Feher | 370/310 |
| 2008/0224995 A1* | 9/2008 | Perkunder | 345/157 |
| 2008/0231611 A1* | 9/2008 | Bathiche et al. | 345/175 |
| 2008/0289886 A1* | 11/2008 | Burkitt | 178/18.03 |
| 2008/0309624 A1* | 12/2008 | Hotelling | 345/173 |
| 2009/0061823 A1 | 3/2009 | Chu | |
| 2009/0066667 A1* | 3/2009 | Feher | 345/173 |
| 2009/0076803 A1* | 3/2009 | Feher | 704/201 |
| 2009/0103250 A1* | 4/2009 | Takashima et al. | 361/679.02 |
| 2009/0295753 A1* | 12/2009 | King et al. | 345/174 |
| 2010/0067674 A1* | 3/2010 | Lee | 379/100.01 |
| 2010/0134428 A1 | 6/2010 | Oh | |
| 2010/0214254 A1* | 8/2010 | Tsai | 345/174 |
| 2011/0014952 A1* | 1/2011 | Minton | 455/566 |
| 2011/0018817 A1* | 1/2011 | Kryze et al. | 345/173 |
| 2011/0043490 A1* | 2/2011 | Powell et al. | 345/176 |
| 2011/0279359 A1* | 11/2011 | McCarty | 345/156 |
| 2012/0110518 A1* | 5/2012 | Chan et al. | 715/863 |
| 2012/0262396 A1 | 10/2012 | Jiyama et al. | |
| 2012/0274591 A1 | 11/2012 | Rimas-Ribikauskas et al. | |
| 2013/0328770 A1* | 12/2013 | Parham | 345/157 |

FOREIGN PATENT DOCUMENTS

| | | |
|---|---|---|
| CN | 101126972 A | 2/2008 |
| CN | 101384979 A | 3/2009 |
| CN | 101408822 A | 4/2009 |
| CN | 101495951 A | 7/2009 |
| CN | 101566920 A | 10/2009 |
| CN | 101799737 A | 8/2010 |
| CN | 101833419 A | 9/2010 |
| EP | 1736856 A2 | 12/2006 |
| JP | H11338628 A | 12/1999 |
| JP | 2005039745 A | 2/2005 |
| JP | 2005322088 A | 11/2005 |
| JP | 2006039745 A | 2/2006 |
| JP | 2006345209 A | 12/2006 |
| JP | 2007042004 A | 2/2007 |
| JP | 2007082020 A | 3/2007 |
| JP | 2008015890 A | 1/2008 |
| JP | 2008097620 A | 4/2008 |
| JP | 2009152836 A | 7/2009 |
| JP | 2009176227 A | 8/2009 |
| JP | 2009237875 A | 10/2009 |
| JP | 2010533336 A | 10/2010 |
| JP | 2012118825 A | 6/2012 |
| JP | 2012221425 A | 11/2012 |
| KR | 10-2005-0035071 | 4/2005 |
| KR | 10-2006-0071353 | 6/2006 |
| KR | 10-2009-0046881 | 5/2009 |
| WO | WO 2006/013485 A2 | 2/2006 |
| WO | WO 2009008686 A2 | 1/2009 |

OTHER PUBLICATIONS

Office Action issued in corresponding Chinese Patent Application No. 201010042617.1, mailed Mar. 3, 2011.

Office Action issued in corresponding Chinese Patent Application No. 20100169417.2, mailed Nov. 7, 2011.

Office Action issued in corresponding Chinese Patent Application No. 201010042617.1, mailed Nov. 7, 2011.

Yoichi Nagashima, Platform for Sound Interaction, Information Processing Society of Japan SIG Report 2008-HCI-128 Human-Computer Interaction 2008-MUS-75, Special Interest Group of Music and Computers, May 21, 2008, vol. 2008, No. 50, pp. 89-94.

* cited by examiner

METHOD AND TERMINAL FOR DISPLAYING PICTURE/INTERFACE

CROSS-REFERENCE TO RELATED APPLICATIONS

This application is a continuation of International Application No. PCT/CN2010/080561, filed on Dec. 31, 2010, which claims priority to Chinese Patent Application No. 201010042617A, filed on Jan. 6, 2010 and Chinese Patent Application No. 201010169417.2, filed on Apr. 30, 2010, all of which are hereby incorporated by reference in their entireties.

FIELD OF TECHNOLOGY

The present application relates to communication technologies, and more particularly, to a method and a terminal for displaying picture/interface.

BACKGROUND OF THE APPLICATION

With development of UI (User Interface, user interface) of a terminal, display modes and operational manners of UI become more and more diverse. For example, a cell phone no longer relies on traditional keyboard input methods but utilizes touch-screen input methods. Again, some display modes are pre-stored in a cell phone, and in operation, a user may enter a corresponding menu to select his favorite display mode in which a picture or interface in the cell phone will be displayed. However, the solution mentioned above imposes a necessity on a user to enter the corresponding menu for selection when he adjusts the display mode, the operations being relatively complex with weak real-time property. With continuous expanding in manners and dimensions of human-machine interactions, the operations on the handheld terminal devices by a user are no longer restricted to triggering of an indicated button or a touch on the screen. Being supported by various sensors, the handheld terminal devices can feel changes in a user's emotions and thoughts more and more, and translate the changes into a human-machine interactive language, such as launching a certain application by sensing a pressure. The prior art is mainly limited in a traditional field such as judging whether to launch the certain application based on a presence of a pressing operation, but can not apperceive the rich language contained in a user's operative actions per se and can not detect fine changes in the operative actions per se.

SUMMARY OF THE APPLICATION

An objective of the embodiments is to provide a method, and a terminal for displaying a picture/interface to solve the problems with the prior art on complex operations and weak real-time property when a user adjusts a display mode.

To address the technical problems mentioned above, an aspect of an embodiment provides a method of displaying a picture/interface on a screen of a terminal, comprising:

obtaining pressure information when pressure is determined to be applied on the screen;

obtaining a corresponding display mode according to the pressure information on the pressure; and displaying the picture/interface according to the display mode.

Another aspect provides a terminal with a display screen, comprising a first obtaining module for obtaining pressure information when pressure is determined to be applied on the screen;

a second obtaining module for obtaining a corresponding display mode according to the pressure information; and a displaying module for displaying the picture/interface according to the display mode.

Another aspect provides a method of user interface operation, comprising:

obtaining a parameter of a pressure applied on a mobile terminal; and determining, according to the parameter of the pressure, a pre-stored operative instruction corresponding to the parameter of the pressure, and performing the operative instruction.

Another aspect provides a mobile terminal, comprising an obtaining module for obtaining a parameter of a pressure applied on a mobile terminal, the parameter of the pressure being a pressure value and a duration, or a pressure variation function;

a calling module for determining, according to the parameter of the pressure, a pre-stored operative instruction corresponding to the parameter of the pressure; and a performing module for performing the operative instruction.

From the above-described technical solutions, the embodiments make the terminal may adjust the display mode automatically according to the pressure applied on the screen of the terminal by the user, by detecting the pressure information applied on the screen and adjusting the display mode of the picture/interface according to the pressure information, with strong real-time property, simplifying the operations by the user on the terminal and improving the user's experience. Meanwhile, by the solution in which the mobile terminal performs different operative instructions with different pressure parameters applied thereon, the operations by the user on the mobile terminal are more simple and faster, enriching the language of human-machine interaction,

BRIEF DESCRIPTION OF THE DRAWINGS

The accompanying drawings are included to provide a further understanding of the claims, are incorporated in, and constitute a part of this specification. The detailed description and illustrated embodiments described serve to explain the principles defined by the claims.

DETAILED DESCRIPTION OF THE EMBODIMENTS

The technical solutions in the embodiments are hereinafter described in detail and completely, with reference to accompanying drawings in the embodiments. The described embodiments are only a part, but not all, of the embodiments.

All of the other embodiments that are obtained by those skilled in the art based on the embodiments without any inventive efforts fall into the scope protected by the claims.

The embodiments are directed to a method and terminal for displaying a picture/interface, wherein an information on a pressure applied on the screen is detected and a display mode of the picture/interface is adjusted according to the information on the pressure, such that the terminal can automatically adjust the display mode according to the pressure applied on the screen by the user. The embodiments have a good real-time property, simplify operations by the user of the terminal, and improve the user's experience.

The embodiments are hereinafter described in detail, with reference to accompanying drawings. The terminal of the embodiments can be any handheld devices with a display screen, such as a computer, a mobile phone, a PlayStation Portable (PSP), a digital frame, a remote control device with a display screen, and so on.

Embodiment 1

Figure 1:
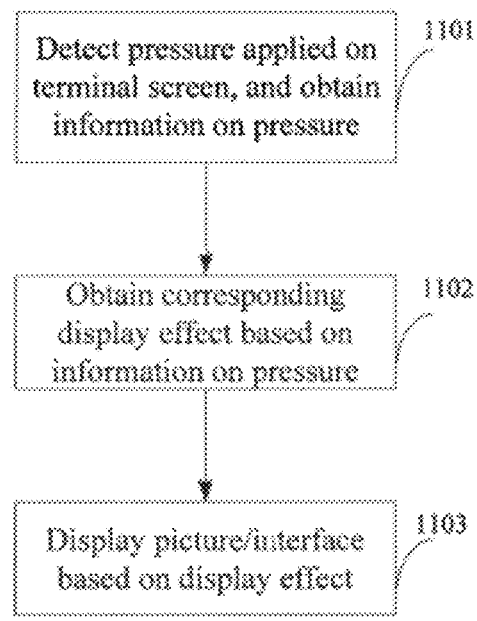
FIG. 1 is a schematic diagram illustrating, a first embodiment.

FIG. 1 is a schematic diagram illustrating the first embodiment.

1101, relevant information on a pressure is obtained, when the pressure is detected to be applied on a screen of a terminal.

The terminal has a built-in sensor. When the pressure is applied on the screen of the terminal, the sensor can detect the pressure and obtain the relevant information on the pressure which includes a position of the pressure, a magnitude of the pressure, a direction of the pressure, a duration of the pressure, a presence frequency of the pressure, and so on, in order to provide the user with a stronger sense of reality, a magnitude level range, a duration level range, a frequency level or on the like of the pressure may be preset in the terminal. For examples, the magnitude levels of the pressure may include level 0, level 1, level 2 and so on; the duration level ranges of the pressure may include a short-time press, a normal press, a continual press and so on; the frequency levels may include a single press, twice presses, multiple presses and so on. Combining the duration and the frequency, the press could be a single short-time press, twice short-time presses, a single continual press, multiple continual presses and so on. When the user presses the screen, the sensor may transfer the detected pressure into a corresponding pressure level, for example, a pressure of level 4 with multiple continual presses.

1102, a corresponding display mode is obtained according to the relevant information on the pressure.

The terminal pre-stores the correspondence between the levels of pressure and the display modes of the picture/interface. After obtaining the pressure level applied on the screen, the corresponding display mode may be obtained according to the correspondence, for example, a display mode of water wave level 1 according to the pressure level applied on the screen.

1103, the picture/interface is displayed according to the display mode.

Upon obtaining the corresponding display mode, the terminal may display the picture/interface according to the display mode. For example, the terminal displays the picture/interface according to the format of water wave level 1.

After displaying the picture/interface according to the display mode, the picture/interface may be displayed in a long period according to the display mode, or the display state of the picture/interface may be restored to the state prior to the displaying according to the display mode when no pressure is detected to be applied on the screen for a predetermined period. Meanwhile, after displaying the picture/interface according to the display mode, the displayed picture/interface according to the display mode may be stored in accordance with the user's operation.

According to an embodiment, when the user views a picture and presses the terminal screen, the terminal detects the pressure applied on the screen, obtains the position, magnitude, and other information on the pressure, obtains the corresponding display mode according to the relevant information on the pressure, and displays the picture according to the display mode. For the picture of the adjusted display mode, the user may otherwise store a copy thereof. Meanwhile, if the user does not press the screen for a predetermined period, the display mode of the picture may be automatically restored to the state prior to the adjustment.

According to an embodiment, the user may adjust the display mode of various interfaces of the terminal. For example, in a state where the terminal is not locked, the user enters the various interfaces and presses the terminal screen. The terminal detects the pressure applied on the terminal screen, obtains the location, magnitude and other information of the pressure applied on the screen, obtains the corresponding display mode according to the relevant information on the pressure, and displays the interface according to the display mode. For the interface of the adjusted display mode, the user may choose the interface of the adjusted display mode as a new interface to display. Meanwhile, if the user does not press the screen for a predetermined period, the display mode of the interface may be automatically restored to the state prior to the adjustment.

According to the above embodiments, by detecting the information of pressure applied on the screen and adjusting the display mode of the picture/interface according to the pressure information, make the terminal capable of automatically adjusting the display mode according to the pressure applied on the screen by the user. Meanwhile, when the user does not press the screen, the picture/interface may be restored to the display mode before pressed. The entertainment and real-time properties are good, the operations by the user of the terminal are simplified and the experience of the user is improved.

Figure 2:
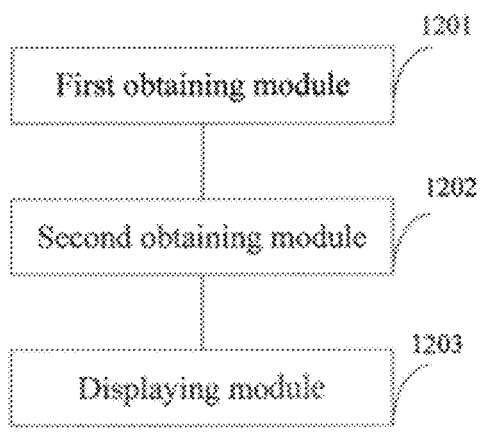
FIG. 2 is a schematic diagram illustrating an embodiment of a device.

FIG. 2 is a schematic diagram illustrating an embodiment of a terminal. A terminal in the embodiment comprises a first obtaining module 1201, a second obtaining module 1202 and a displaying module 1203, wherein the first obtaining module 1201 obtains relevant information on a pressure, when the pressure is detected to be applied on the screen, the second obtaining module 1202 obtains a corresponding display mode according to the relevant information on the pressure, and the displaying module 1203 displays the picture/interface according to the display mode.

According to an embodiment of the terminal, when the user views a picture and presses the terminal screen, the first obtaining module 1201 detects the pressure and obtains the relevant information on the pressure, the second obtaining module 1202 obtains the corresponding display mode according to the relevant information on the pressure, and the displaying module 1203 displays the picture according to the display mode. For the picture of the adjusted display mode, the user may otherwise store a copy thereof. Meanwhile, when the user does not press the screen for a predetermined period, the display mode of the picture may be automatically restored to the state prior to the adjustment.

According to an embodiment of the terminal, the user may adjust the display mode of various interfaces of the terminal. For example, in a state where the terminal is not locked, the user enters the various interfaces and presses the terminal screen. The first obtaining module 1201 detects the pressure applied on the terminal screen, obtains the location, magnitude and other information on the pressure applied on screen. The second obtaining module 1202 obtains the corresponding display mode according to the relevant information on the pressure. The displaying module 1203 displays the interface according to the display mode. For the interface of the adjusted display mode, the user may choose the interface of the adjusted display mode as a new interface to display. Meanwhile, when the user does not press the screen for a predetermined period, the display mode of the interface may be automatically restored to the state prior to the adjustment.

Figure 3:
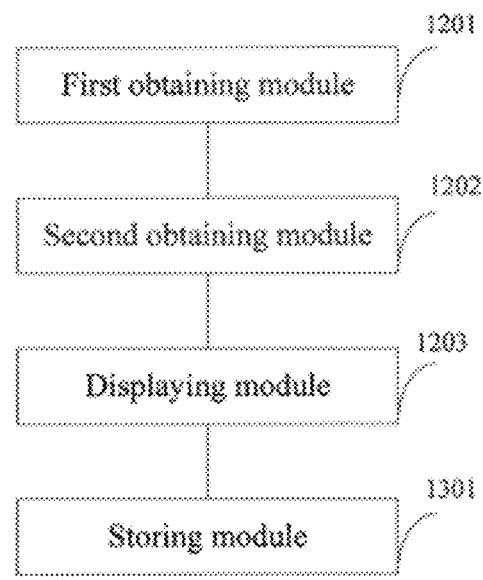
FIG. 3 is another schematic diagram illustrating an embodiment of a device.

As illustrated in FIG. 3, a terminal embodiment may further comprise a storing module 1301. For the picture of the adjusted display mode, the storing module 1301 stores, in accordance with the user's instruction, the picture/interface displayed according to the display mode.

Figure 4:
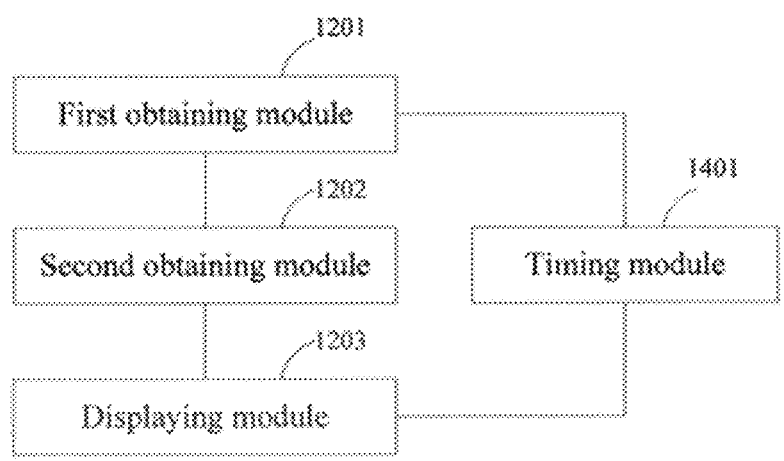
FIG. 4 is another schematic diagram illustrating an embodiment.

As illustrated in FIG. 4, a terminal embodiment may further comprise a timing module 1401. After the displaying module displays the picture/interface according to the display mode, the timing module 1401 starts to count time. If the counted time arrives a predetermined period before the first obtaining module 1201 detects a pressure again, the displaying module 1203 may restore the display state of the picture/interface to a state prior to the displaying according to the display mode.

According to the above embodiments, the terminal embodiments, by detecting the information of pressure applied on the screen and adjusting the display mode of the picture/interface according to the pressure information, make the terminal capable of automatically adjusting the display mode according to the pressure applied on the screen by the user. Meanwhile, when the user does not press the screen, the picture/interface may be restored to the display mode before pressed. The entertainment and real-time properties are good, the operations by the user of the terminal are simplified and the experience of the user is improved.

Embodiment 2

Figure 5:
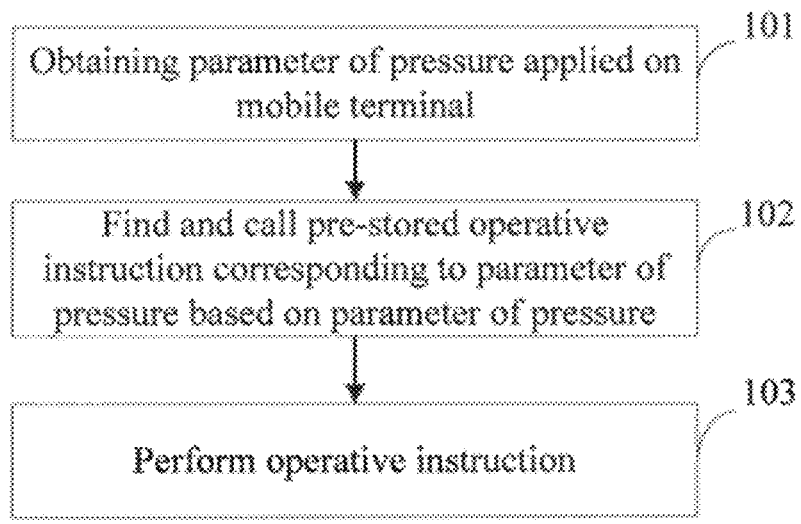
FIG. 5 is a flow chart illustrating a second embodiment.
Figure 6:
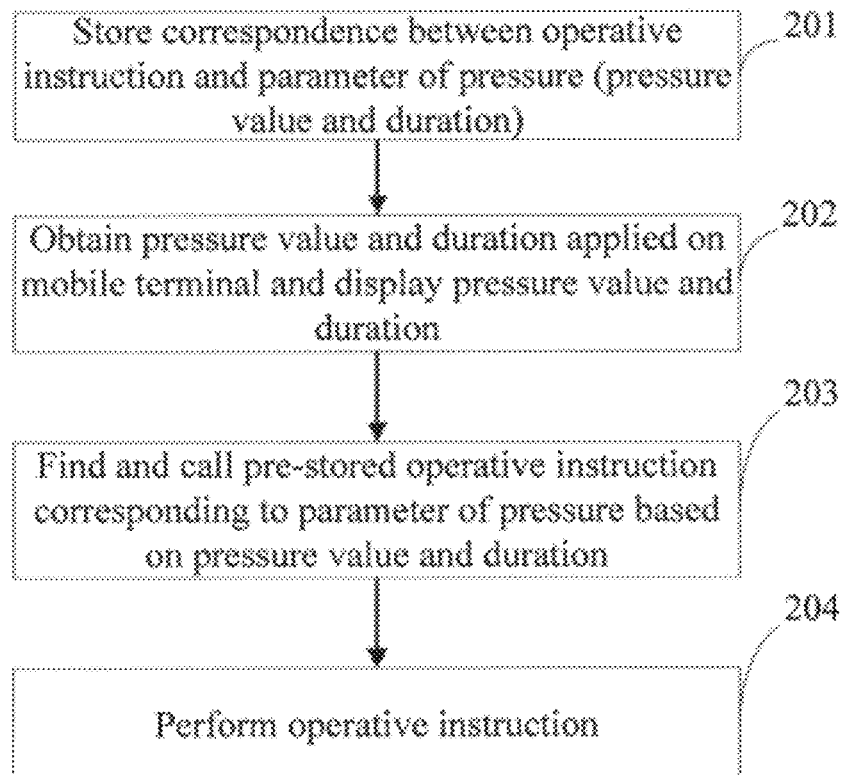
FIG. 6 is a flow chart illustrating a third embodiment.

The second embodiment provides a method user interface operation. With reference to FIG. 5, the method comprises the steps as follows.

Step 101 obtains parameter(s) of a pressure applied on a mobile terminal. The parameter(s) of the pressure is that related to the pressure sensed by the mobile terminal. The mobile terminal may obtain the parameter(s) of the pressure applied thereon with a pressure sensing device such as a pressure sensor. The embodiments described above for obtaining the parameter(s) of the pressure are not limited those discussed above.

Step 102 determines, according to the parameter(s) of the pressure, a pre-stored operative instruction corresponding to the parameter(s) of the pressure. After obtaining the parameter(s) of the pressure applied on the screen, the operative instruction which corresponds to the parameter(s) of the pressure is found, and the found instruction is called.

Step 103 performs the operative instruction.

The embodiment renders the operations by the user on the mobile terminal more simple and faster and enriches the by the languages of human-machine interaction, through the technical solutions of performing different operative instructions for different parameter(s) of the pressure applied on the mobile terminal.

The embodiment 2 may be extended as below.

Embodiment 3

The third embodiment provides a method of user interface operation. With reference to FIG. 5, the method comprises the steps as follows.

Step 201 stores a correspondence between operative instructions and pressure parameters (e.g. a pressure value and a duration). The correspondence is one defined by the user or default in the system. In the embodiment, the pressure parameters include the pressure value and the duration. The operative instructions includes opening, deleting, renaming or other simple instructions, opening or closing an application, zooming out or zooming in a picture, or the like. Of course, the operative instructions of the embodiments include but do not limit to the above-mentioned instructions. Table 1 shows the correspondence between the pressure parameters (e.g. the pressure value and the duration) and the operative instructions. The detail explanation for table 1 is given below.

TABLE 1

| Operation No. | Pressure parameters (pressure value and duration) | Operative instructions |
|---|---|---|
| 1 | 1 N-2 s | Open program |
| 2 | 1 N-4 s | Rename |
| 3 | 2 N-4 s | Close program |

Step 202 obtains the pressure value and the duration applied on the mobile terminal. The mobile terminal may obtain the pressure value applied thereon with a pressure sensing device such as a pressure sensor. Specifically, the pressure sensor may be a resistive strain-gauge pressure sensor, a semiconductor strain-gauge pressure sensor, a piezoresistive pressure sensor, an inductive pressure sensor, a capacitive pressure sensor, a resonant pressure sensor, or the like. Of course, the embodiment includes but does not limit to the above-mentioned ways to obtain the pressure value. The duration indicates a time value applied with the pressure value in terms of the time. For example, a pressure value applied on a mobile terminal is 2 newtons (i.e. 2 N). The continual applied time under the pressure value of 2 newtons lasts for 3 seconds (i.e. 3 s), which means the terminal is applied a force of 2 newtons for a duration of 3 seconds. Indeed, the pressure value may be an approximation, for example, 1.6 N≈2 N, or 1.4 N≈1 N. Various effective algorithm to get the value may be set on demand of the user or the system:

Referring to table 1, the operation No. 1 indicates that a continual pressure of 1 N is applied on the mobile terminal for a duration of 2 s, that is, the duration with 1N pressure is 2 s, and the corresponding operative instruction is to open a program. The operation No. 2 indicates that the mobile terminal is continually pressed with 1 N for a duration of 4 s, and the corresponding operative instruction is to rename In addition, while at the step 202 obtaining the pressure value and the duration applied on the mobile terminal, the pressure value and the duration may be displayed on the touch screen. Intuitionistic display of the pressure value provides the user with a direct sense of the pressure and time applied on the mobile terminal, so as to provide a notification for the operations of the user and improve the experience of the user operation.

Of course, the correspondence between the pressure parameters and the operative instructions may be set up on demand by the users themselves or default in the system. For example, if the user is a kid, when he operatives the mobile terminal, the pressure applied on the touch screen may be lighter relatively, and lower pressure parameters may be set to be correspond to the very common operative instructions.

Further, the mobile terminal may determine an attribute of the user by detecting biologic characteristic information of the user, and call the correspondence between the pressure parameters and the operative instructions according to the attribute of the user, without manual setting by the user according to the attributes of different users. For example, when a user starts to operate a mobile terminal, the mobile terminal may detect the attribute of the user by collecting the biologic characteristic information of the user. If the user is detected to be a kid, the correspondence between the operative instructions and the pressure parameters which is suitable for kids may be called automatically. After obtaining the pressure value and the duration, the mobile terminal would automatically find the relevant sequence number. For example, referring to Table 2 as compared with Table 1, the attribute of the user is added into the correspondence of Table 2. By determining the attribute of the user, the pressure parameters to be called are determined.

TABLE 2

| User attribute | Operative No. | Pressure parameters (pressure value and duration) | Operative instructions |
|---|---|---|---|
| Kid | 1 | 1 N-2 s | Open program |
| | 2 | 1 N-4 s | Rename |
| | 3 | 2 N-4 s | Close program |
| Adult | 1 | 4 N-3 s | Open program |
| | 2 | 6 N-4 s | Close program |
| Senior | 1 | 1 N-2 s | Open program |
| | 2 | 1 N-3 s | rename |

The detection of the biologic characteristics may be face recognition, finger-print recognition, voice recognition, or the like. The embodiments are not limited to the above-mentioned ways to determine the attribute of the user. The attribute of the user is a gender (male or female), or age attribute (kid, adult or senior). As such, the users may set up different pressure values and durations, rendering that the different users may have various experiences when operating the interface, improving the facilitation of the mobile terminal greatly.

Step 203 determines, according to the pressure value and the duration, a pre-stored operative instruction which corresponds to the parameter of the pressure.

Referring to Table 1, the operation No. 1 indicates a continual pressure of 1 N is applied on the mobile terminal for a duration of 2 s, that is, the duration with 1 N pressure is 2 s. According to the pressure parameters, i.e. the pressure value 1 N and duration 2 s, the mobile terminal finds in the correspondence a pre-stored operative instruction corresponding to the pressure parameters, and the corresponding operative instruction is to open a program. The operation. No. 2 indicates that the mobile terminal is continually pressed with 1 N for a duration of 4 s. According to the pressure parameters, i.e. the pressure value 1 N and duration 4 s, the mobile terminal finds in the correspondence a pre-stored operative instruction corresponding to the pressure parameters, and the corresponding operative instruction is to rename. Of course, in the embodiments, the correspondence between the pressure parameters and the operative instructions may he set up on the various demands of the users by themselves or default in the system.

Step 204 performs the operative instruction. The mobile terminal is operated according to the corresponding operative instruction which was found in step 203.

By the technical solution of performing different operative instructions for different pressure parameters applied on the mobile terminal, the embodiments make the operations by the user on the mobile terminal more simple and faster, enriching the language of human-machine interaction and improving the user's experience remarkably.

Embodiment 4

Figure 7:
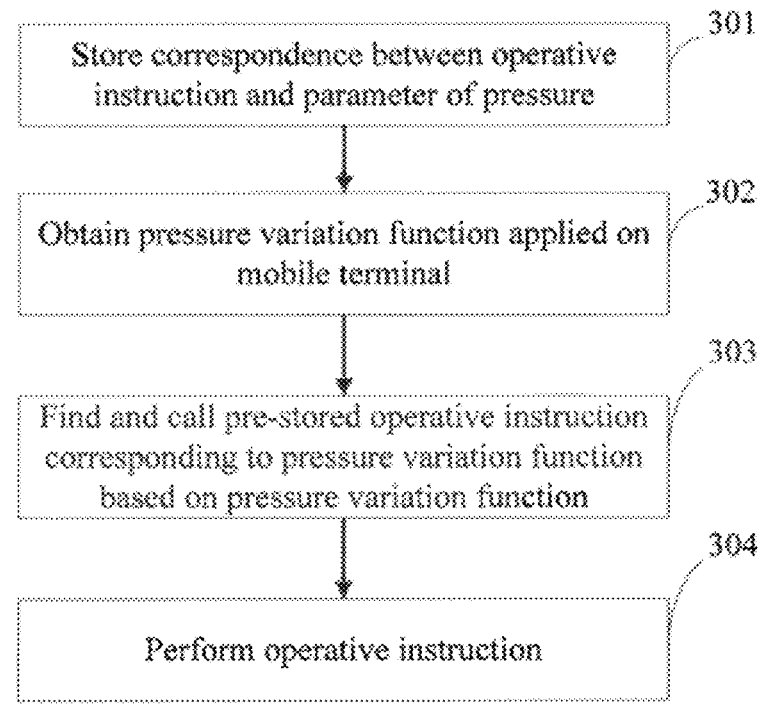
FIG. 7 is a flow chart illustrating a fourth Embodiment.
Figure 8:
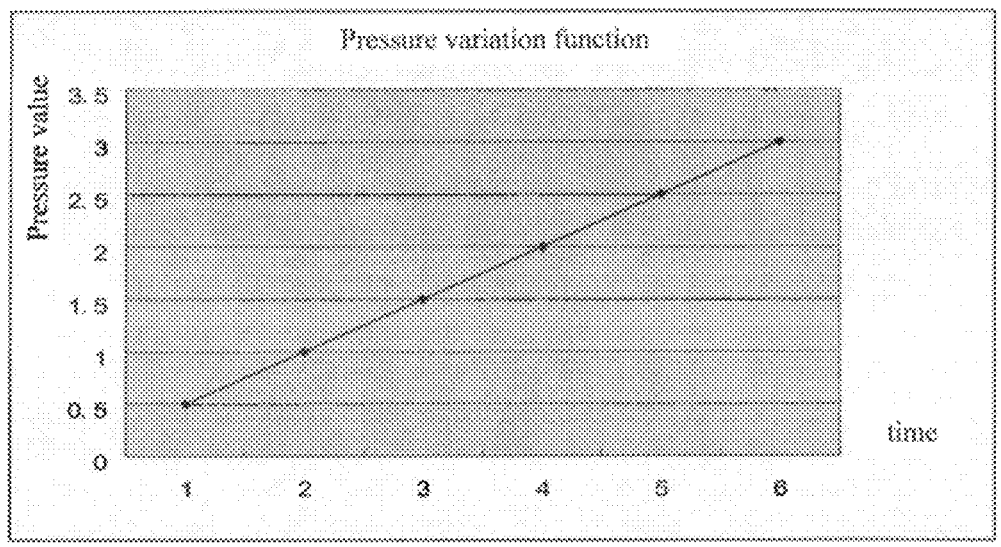
FIG. 8 is a schematic diagram illustrating a pressure variation function of the fourth embodiment.

The fourth embodiment provides a method of user interface operation. With reference to FIG. 7, the method comprises the steps as follows.

Step 301 stores a correspondence between operative instructions and pressure parameters. The correspondence is user-defined or default in system. In the embodiments, specifically, the pressure parameter may include a pressure variation function. In particular, the operative instructions may include opening, deleting, renaming or other simple instructions, opening or closing an application, zooming out or zooming in of a picture, or the like. Of course, the operative instructions of the embodiment include but are not limited to the above-mentioned instructions. For example, as shown in the fallowing Table 3, in the case that the pressure variation function f(x,y) is an increasing one, the corresponding operative instruction is to keep zooming in the picture.

TABLE 3

| Operative No. | Pressure parameters (pressure variation function) | Operative instructions |
|---|---|---|
| 1 | f(x,y) increasing | Keep zooming in the picture |
| 2 | f(x,y) decreasing | Keep zooming out the picture |

In the embodiments, the parameter of the pressure is the pressure variation function N=f(x,y), wherein x is the pressure value, and y refers to the time. The function may be a functional curve varying with the pressure value and the time, that is, a function of the pressure value and time, for example, an increasing function as the time varies. For example, as shown in FIG. 4, variation in the pressure value with different time is diagrammed. FIG. 4 indicates a curve of the pressure variation function in such case of N=f(x,y) and it can be known that the function is an increasing function.

TABLE 4

| x (in unit of newton: N) | y (in unit of second: s) |
|---|---|
| 0.5 | 1 |
| 1 | 2 |
| 1.5 | 3 |
| 2 | 4 |
| 2.5 | 5 |
| 3 | 6 |

Step 302 obtains the pressure variation function applied on the mobile terminal. The mobile terminal obtains the pressure variation function, according to the pressure values obtained at different times, and calculates the property of the function, i.e. increasing or decreasing.

Step 303 determines, according to the pressure variation function, a pre-stored operative instruction which corresponds to the pressure variation function.

Step 304 performs the operative instruction.

Preferably, as shown in Table 3, when the pressure variation function f(x,y) is increasing, the corresponding operative instruction is to keep zooming out the picture. When the mobile terminal detects that the pressure variation function is increasing, it keeps zooming out the picture according to the pre-determined correspondence between the pressure value and the zooming of the picture. The pre-determined correspondence may be user-defined or default in system.

By the technical solution of performing different operative instructions for different pressure variation functions applied on the mobile terminal, the embodiments make the operations by the user on the mobile terminal more simple and faster, enriching the language of human-machine interaction and improving the user's experience remarkably.

Embodiment 5

Figure 9:
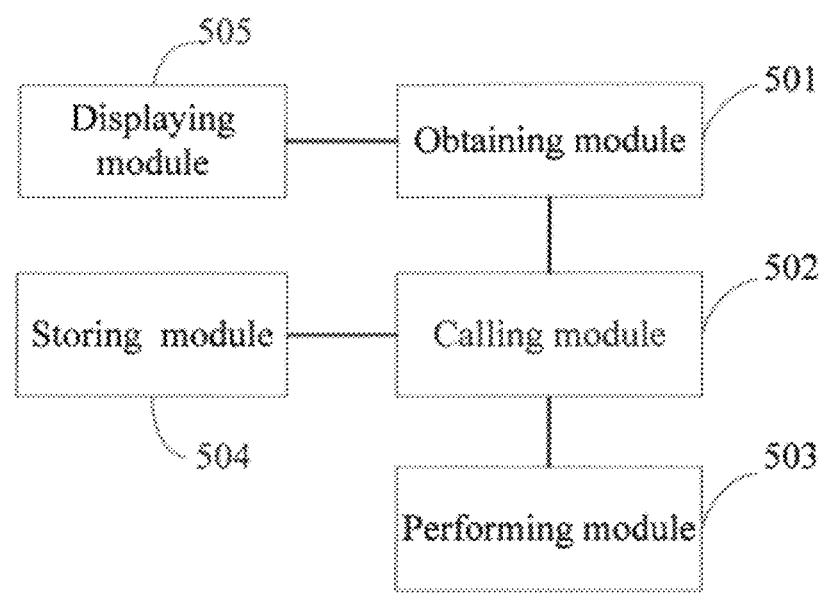
FIG. 9 is a schematic diagram illustrating a mobile terminal of a fifth embodiment.

The fifth embodiment provides a mobile terminal. As shown by FIG. 9, the mobile terminal comprises an obtaining module 501, a calling module 502 and a performing module 503.

The obtaining module 501 is for obtaining parameter(s) of a pressure applied on a mobile terminal. In particular, the parameter(s) of the pressure may include a pressure value and a duration, or include a pressure variation function. The specific definitions of the parameter(s) of the pressure may refer to the embodiments described above. The obtaining module may be any pressure sensing device, for example a resistive strain-gauge pressure sensor, a semiconductor strain-gauge pressure sensor, a piezoresistive pressure sensor, an inductive pressure sensor, a capacitive pressure sensor, a resonant pressure sensor, or the like.

The calling module 502 is for determining, according to the parameter(s) of the pressure, a pre-stored operative instruction corresponding to the parameter(s) of the pressure.

The performing module 503 is used for performing the operative instruction.

The mobile terminal may further comprise a storing module 504 for storing a correspondence between the operative instructions and the parameters of the pressure. The correspondence has been explained in the above embodiments.

The mobile terminal may further comprise a displaying module 505 for displaying the parameter(s) of the pressure obtained by the obtaining module 501.

The mobile terminal may be a terminal device with a touch screen, such as a mobile phone, a personal digital assistance (PDA), a home information display (HID), a mobile internet device (MID), or the like.

It is to be noted that the above embodiments are merely exemplary are not intended to limit the scope of the claims. While the embodiments have been explained particularly with respect to the information described above, those skilled in the art should understand that the technical solutions described in the embodiments may stilled be modified, or equivalently replaced with parts of the technical features thereof; and such modifications and replacements will not make the nature of the corresponding technical solutions depart from the spirit and scope of the claims.

What is claimed is:

1. A method of displaying a picture/interface on a screen of a terminal, comprising:
    obtaining pressure information when pressure is determined to be applied on the screen, the pressure information including a presence frequency of the pressure;
    obtaining a corresponding display mode according to the pressure information; and
    displaying the picture/interface according to the display mode.

2. The method of claim 1, further comprising storing, according to a user instruction, the picture/interface displayed according to the display mode.

3. The method of claim 1, further comprising restoring a display state of the picture/interface to a state prior to the displaying according to the display mode if it is determined that no pressure is applied on the screen of the terminal in a predetermined period, after displaying the picture/interface according to the display mode.

4. The method of claim 1, wherein the pressure information further includes at least one of a position of the pressure, a magnitude of the pressure, and a direction of the pressure, a duration of the pressure.

5. The method of claim 1, wherein the terminal corresponds to at least one of: a computer, a cell phone, a PlayStation Portable, a digital photo frame, and a remote device with a display screen.

6. A terminal with a display screen, comprising
    a first obtaining module for obtaining pressure information when pressure is determined to be applied on the screen, the pressure information including a presence frequency of the pressure;
    a second obtaining module for obtaining a corresponding display mode according to the pressure information; and
    a displaying module for displaying the picture/interface according to the display mode.

7. The terminal of claim 6, further comprising a storing module for storing, according to a user instruction, the picture/interface displayed according to the display mode.

8. The terminal of claim 6, further comprising a timing module, wherein the timing module starts to count time after the displaying module displays the picture/interface according to the display mode, and if the counted time arrives a predetermined period before the first obtaining module detects a pressure again, the displaying module restores a display state of the picture/interface to a state prior to the displaying according to the display mode.

9. The terminal of claim 6, wherein the pressure information further includes at least one of: a position of the pressure, a magnitude of the pressure, a direction of the pressure, and a duration of the pressure.

10. The terminal of claim 6, wherein the terminal corresponds to at least one of: a computer, a cell phone, a PlayStation Portable, a digital photo frame, and a remote device with a display screen.

11. A method of user interface operation, comprising:
    pre-storing data that defines a correspondence between an operative instruction and a pressure variation function, wherein the correspondence is one of a user-defined or a default correspondence in a system;
    obtaining the pressure variation function applied on a mobile terminal;
    determining, according to the pressure variation function, a pre-stored operative instruction corresponding to the pressure variation function; and
    performing the operative instruction.

12. The method of claim 11, further comprising zooming out a picture continuously in accordance with a predetermined relation when the pressure variation function is an increasing function, or zooming in the picture continuously in accordance with the predetermined relation when the pressure variation function is a decreasing function.

13. A mobile terminal, comprising
    a storing module configured to store a correspondence between the operative instruction and a pressure variation function;

an obtaining module configured to obtain the pressure variation function applied on a mobile terminal;

a calling module configured to determine, according to the pressure variation function, a pre-stored operative instruction corresponding to the pressure variation function; and a performing module for performing the operative instruction.

14. The mobile terminal of claim 13, further comprising a displaying module configured to display the pressure variation function obtained by the obtaining module.

15. The mobile terminal of claim 13, wherein the mobile terminal is a cell phone.

\* \* \* \* \*